United States Patent [19]
Holzhammer

[11] Patent Number: 5,519,831
[45] Date of Patent: May 21, 1996

[54] NON-VOLATILE DISK CACHE

[75] Inventor: Gerald S. Holzhammer, Aloha, Oreg.

[73] Assignee: Intel Corporation, Santa Clara, Calif.

[21] Appl. No.: 252,619

[22] Filed: Jun. 1, 1994

Related U.S. Application Data

[63] Continuation of Ser. No. 715,105, Jun. 12, 1991, abandoned.

[51] Int. Cl.$^6$ .................................................. G06F 11/34
[52] U.S. Cl. ........................................ 395/182.2; 365/228
[58] Field of Search ..................................... 395/575, 403, 395/468, 469, 488, 182.2; 365/228, 229; 371/66

[56] References Cited

U.S. PATENT DOCUMENTS

| | | | |
|---|---|---|---|
| 4,327,410 | 4/1982 | Patel et al. | |
| 4,523,295 | 6/1985 | Zato | 364/900 |
| 4,578,774 | 3/1986 | Muller | 371/62 |
| 4,897,631 | 1/1990 | Jundt et al. | |
| 4,901,283 | 2/1990 | Hanbury et al. | 365/222 |
| 4,908,790 | 3/1990 | Little et al. | 364/900 |
| 4,959,774 | 9/1990 | Davis | 364/200 |
| 4,977,537 | 12/1990 | Dias et al. | 364/900 |
| 4,979,143 | 12/1990 | Takano et al. | 364/900 |
| 5,018,148 | 5/1991 | Patel et al. | 371/66 |
| 5,175,842 | 12/1992 | Totani | 364/228 |
| 5,204,840 | 4/1993 | Mazur | 365/228 |
| 5,204,963 | 4/1993 | Noya et al. | 365/229 |
| 5,283,884 | 2/1994 | Menon et al. | 364/200 |
| 5,297,148 | 3/1994 | Harari et al. | |

FOREIGN PATENT DOCUMENTS

| | | | |
|---|---|---|---|
| 0528039 | 2/1993 | Japan | G06F 12/08 |
| 6231053 | 8/1994 | Japan | G06F 1/30 |
| 2201268 | 8/1988 | United Kingdom | |

Primary Examiner—Robert W. Beausoliel, Jr.
Assistant Examiner—Albert Decady
Attorney, Agent, or Firm—Blakely, Sokoloff, Taylor & Zafman

[57] ABSTRACT

A method and apparatus in a computer system for storing data from a volatile cache during a power loss. The apparatus comprises a volatile cache memory and a non-volatile memory. In a preferred embodiment, the non-volatile memory is an electrically erasable programmable read-only memory. The device further comprises power loss detection logic which detects the power loss in the computer system and copy control logic which copies the data contained in the volatile cache memory to the non-volatile memory upon detection of the power loss. The copy control logic is coupled to the volatile cache, the non-volatile memory, and the power loss detection logic. In a preferred embodiment, the copy control logic and the power loss detection logic comprise a microcontroller. The device lastly comprises a power source coupled to the volatile cache memory and the copy control logic, the power source being independent of the computer system power. In a preferred embodiment, the power source comprises a battery coupled to the microcontroller and the volatile and non-volatile memories. Methods are provided to copy to and restore data from a non-volatile memory when computer system power is lost or restored.

18 Claims, 10 Drawing Sheets

NON-VOLATILE DISK CACHE

This is a continuation of application Ser. No. 07/715,105, filed Jun. 12, 1991, now abandoned.

BACKGROUND OF THE INVENTION

1. Field of the Invention

This invention relates to the field of computer systems employing non-volatile media. More specifically, this invention relates to a non-volatile cache for devices such as disk drives in a computer system.

2. Description Of the Related Art

Attempts are constantly made to increase the performance of modern computer systems. Typically, because input/output devices such as disk drives are slower than the circuitry in computer systems (such as central processing units and/or memory devices), attempts have been made to increase the performance of these I/O devices. However, because such devices are electromechanical in nature, there is a finite limit beyond which performance cannot be increased. Other methods and devices have thus been developed for reducing the I/O bottleneck in order to increase overall computer system performance.

Once way to reduce the information bottleneck for I/O devices such as a disk drives is to use a cache. A cache is a memory device which logically resides between a device and the remainder of the computer system such as a central processing unit(s) and/or computer bus. A cache is an area of memory which serves as a temporary storage area for the device (such as computer memory or a disk drive). Frequently accessed data resides in the cache after an initial access and a subsequent accesses to the same data will be made to the cache instead of the device. A cache for memory typically uses a higher speed type of memory, such as static memory, for the cache memory than the main computer system's memory, which is typically implemented in dynamic memory. A cache for a disk drive can generally reside in computer main memory, but may also reside in a separate device coupled to the system bus. One such system containing memory, a processor and fixed media devices (such as disk drives) used in conjunction with a cache is shown as system 100 in FIG. 1.

System 100 in FIG. 1 is a computer system with multiple disk drives 121 through 125. Computer system 100 comprises a bus 101 for communicating information between a processor 102 and devices such as main memory 104 and disk drives 121 through 125. Disk drives 121 through 125 are accessible via lines 110 coupled to bus 101, or, alternatively, through cache 120. As discussed previously, if a particular datum in one of the disks 121 through 125 is accessed that was read on a previous access, that location will reside in cache 120. The datum will be in the cache unless it has been replaced using the system's cache replacement or coherency algorithm. In the case of a "cache hit" (the data resides in the cache), the data will be retrieved directly from cache 120. In the case of a "cache-miss" (the data is not contained in cache 120), the information will be retrieved directly from the fixed media drive over lines 110 to bus 101. The data may be made available to processor 102, or alternatively loaded into main memory 104 in a direct memory access (DMA) system. In the event of a "cache-miss" the data will also be placed into cache 120 for later accesses.

Write operations are treated differently than reads. There are two basic methods for writing data to a cache: the "write-through" (or store-through) cache replacement algorithm; and the "write-back" (or copy back or store in) cache replacement algorithm. In a write-through replacement algorithm, every time a write is made the information is written to the cache and a simultaneous request is made on the bus to write the data to the fixed media device(s). Cache contents always remain consistent with the contents of the disk drive. In a "write-back" cache replacement algorithm, the information is written only to the cache. Logic in the computer system writes the cache block to the device only when the cache block is modified. In a write-back caching system, cache contents are considered "dirty" when they are inconsistent with the contents of fixed media device(s). If the cache contents are modified and the disk has not yet been updated from the cache, then the cache block is flagged as "dirty" indicating that it needs to be written to the disk. An area is typically reserved in a cache such as 120 to store information to indicate whether blocks stored in the cache are clean or dirty. This area is known as a cache "tag." If a block is "dirty," then the location is flagged using a status bit. The dirty block is written back to the disk at a time when the cache is idle, or when modified cache contents are to be replaced by new data. After writing the data back to the disk, the "dirty" bit is cleared. Under normal operating circumstances, a write-back cache substantially increases device and thus overall system performance as disk operations are performed only when absolutely necessary. However, if computer system power is lost while data contained in the cache is "dirty," then the device will not be updated with current data. This may result in corruption of files stored on the disk, because certain allocation tables or other file linkage information stored on the device may not be complete prior to the computer system losing power. Also, data contained within cache 120 is irretrievably lost. The losing of system power while the cache contains "dirty" data is therefore to be avoided whenever possible to avoid data loss and file corruption on disk drives coupled to the computer system.

A typical prior art software architecture for controlling fixed media devices is shown in FIG. 2. 200 in FIG. 2 is representative of a software architecture used by a UNIX (UNIX is a trademark of AT&T Bell Laboratories of Murray Hill, N.J.) brand operating system. 200 comprises a device switch unit 201 which is responsible for directing logical device accesses to software drivers responsible for physical media devices coupled to the system. For example, one logical device driver 202 may be directed towards physical device driver driver A 210, thus controlling physical devices 121 and 122. A second logical device driver 203 may result in an access to a second physical device driver 211, and thus be directed towards physical medium 123. Numerous logical devices may be defined in prior art system 200, all accesses to particular logical devices being directed by device switch unit 201. Numerous logical devices may map to the same physical device unit(s). For instance, yet another logical device 204 represented in device switch unit 201 may be directed towards the same physical device driver A 210, and thus to physical media 121 and 122. Caching schemes as implemented by certain prior art systems are contained within the device driver(s) such as 210 and 211 shown in FIG. 2. The device drivers handle all read and write operations, whether to the cache device(s) or to the physical media themselves. Also, drivers 210 and 211 handle all write-back requests to the physical media at appropriate times, such as when data becomes "dirty" and when specified periods of time elapse under an LRU (least recently used) algorithm.

An alternative remedy to the loss of data contained in a volatile cache is the use of a battery to power the cache. If computer system power is lost, data contained within the cache is retained because memory continues to be powered by the battery. When system power is restored, the system resumes normal operation and valid data still resides in the cache waiting to be written-back to disk. This solution is dependent upon the battery having power to retain the memory in the cache for the duration of the system power loss. If the battery is exhausted during the interval when there is no system power, data contained in the cache will be lost. Because battery power is finite and memory circuits such as dynamic memory devices require refreshing at regular intervals (thus consuming power at a fairly high rate) special care must be taken that the battery has the capacity to retain the data for a worst case. Worst case failures cannot be absolutely anticipated, batteries sometimes suffer from reliability problems, resulting in premature failure and a system may be without power for a long period of time, so the loss of data in a battery-backed cache may still occur.

One prior method to avoid corruption of fixed media devices coupled to a computer system is that used by the UNIX brand operating system during the system power-up initialization process (or bootstrap). During a system bootstrap, all fixed media devices coupled to a UNIX brand system are scanned to determine whether any file allocation tables or file indices residing on each disk need to be restored. Incomplete files or file indices results in the inability of the system to read these files. If any file indices or other file linkage information is incomplete, then the system software repairs the indices and pointers for the files as best as can be approximated to prevent the file corruption. This process, however, consumes an inordinate amount of real-time during system bootstrap, because all sectors and tracks of allocated sections in fixed media devices coupled to the system must be scanned. Depending on how much storage is available on the system, such a fie verification process substantially increases the amount of time needed for system initialization even after losing power for only a short period of time. In an MS-DOS brand operating system, in contrast, where no such file verification process takes place, the loss of system power while "dirty" information is still contained in the cache will result in the corruption or inability of files and data loss in fixed media devices coupled to the system.

SUMMARY AND OBJECTS OF THE INVENTION

One of the objects of the present invention is to provide an improved architecture and method for storing data contained in a device cache for periods when the computer system power is lost.

Another object of the present invention is to provide a means for storing data contained in a device cache indefinitely for periods when a computer system loses power.

Another object of the present invention is to provide a relatively fast and efficient way for a computer system using caching to perform an initialization after computer system power has been lost.

These and other objects of the present invention are provided for by an apparatus in a computer system for storing data from a volatile cache during a power loss. The apparatus comprises a volatile cache memory and a non-volatile memory. In a preferred embodiment, the non-volatile memory is an electrically erasable programmable read-only memory. The device further comprises a means for detecting the power loss in the computer system and a means for copying the data contained in the volatile cache memory to the non-volatile memory upon detection of the power loss. The copying means is coupled to the volatile cache, the non-volatile memory, and the detecting means. In a preferred embodiment, the detecting and the copying means comprise a microcontroller. The device lastly comprises a means for powering coupled to the volatile cache memory and the copying means, the means for powering being independent of the computer system power. In a preferred embodiment, the powering means comprises a battery coupled to the microcontroller and the volatile and non-volatile memories.

These and other objects of the present invention are provided for by a method in a computer system of storing the data contained in a volatile cache for a device coupled to the computer system to a non-volatile memory upon losing computer system power. The method first detects a power loss in the computer system. A first location is determined in the non-volatile memory, the fast location being at the last location in the non-volatile memory at which dam was written. Then, a first set of data is written from the volatile cache into the non-volatile cache starting at the last location, the first set of data comprising data which has been modified but has not been written to the device. The method may further comprise determining a last location in the non-volatile memory at which valid data resided. The method then writes the first set of data to the device and determines whether there is sufficient memory in the non-volatile memory to store a second set of data. If there is not sufficient memory then the non-volatile memory is erased and it is determined whether the number of erasures of the non-volatile memory has exceeded a first value. In a preferred embodiment the first value is the maximum number of times the non-volatile memory may be erased and guarantee data integrity. If the number of erasures exceeds this value, then the computer system is inhibited from writing to the non-volatile memory.

These and other objects of the present invention are provided for by a method of restoring the data contained in a non-volatile memory to a computer system device coupled to a computer system. The method determines a last location in the non-volatile memory at which valid device data resided. Then, data starting at the last location which was modified but not written to the device contained in the non-volatile memory is written to the device. It is then determined whether there is sufficient memory in the non-volatile memory to store additional data. If there is not sufficient memory, the non-volatile memory is erased. Then, it is determined whether the number of erasures of the non-volatile memory has exceeded a first value. If it has, the computer system is inhibited from writing to the non-volatile memory. If a preferred embodiment, the user is also notified that the non-volatile memory needs to be replaced.

BRIEF DESCRIPTION OF DRAWINGS

The present invention is illustrated by way of example and not limitation in the figures of the accompanying drawings in which like references indicate similar elements and in which.

DETAILED DESCRIPTION

A non-volatile cache and methods for using the cache are described. In the following description, for the purposes of explanation, numerous specific details are set forth such as dam structures, circuitry, etc. in order to provide a thorough understanding of the present invention. It will be obvious, however, to one skilled in the an that the present invention may be practiced without some of these specific details. In other instances, well known circuits, data structures and techniques have not been shown in detail in order to not unnecessarily obscure the present invention.

Figure 3:
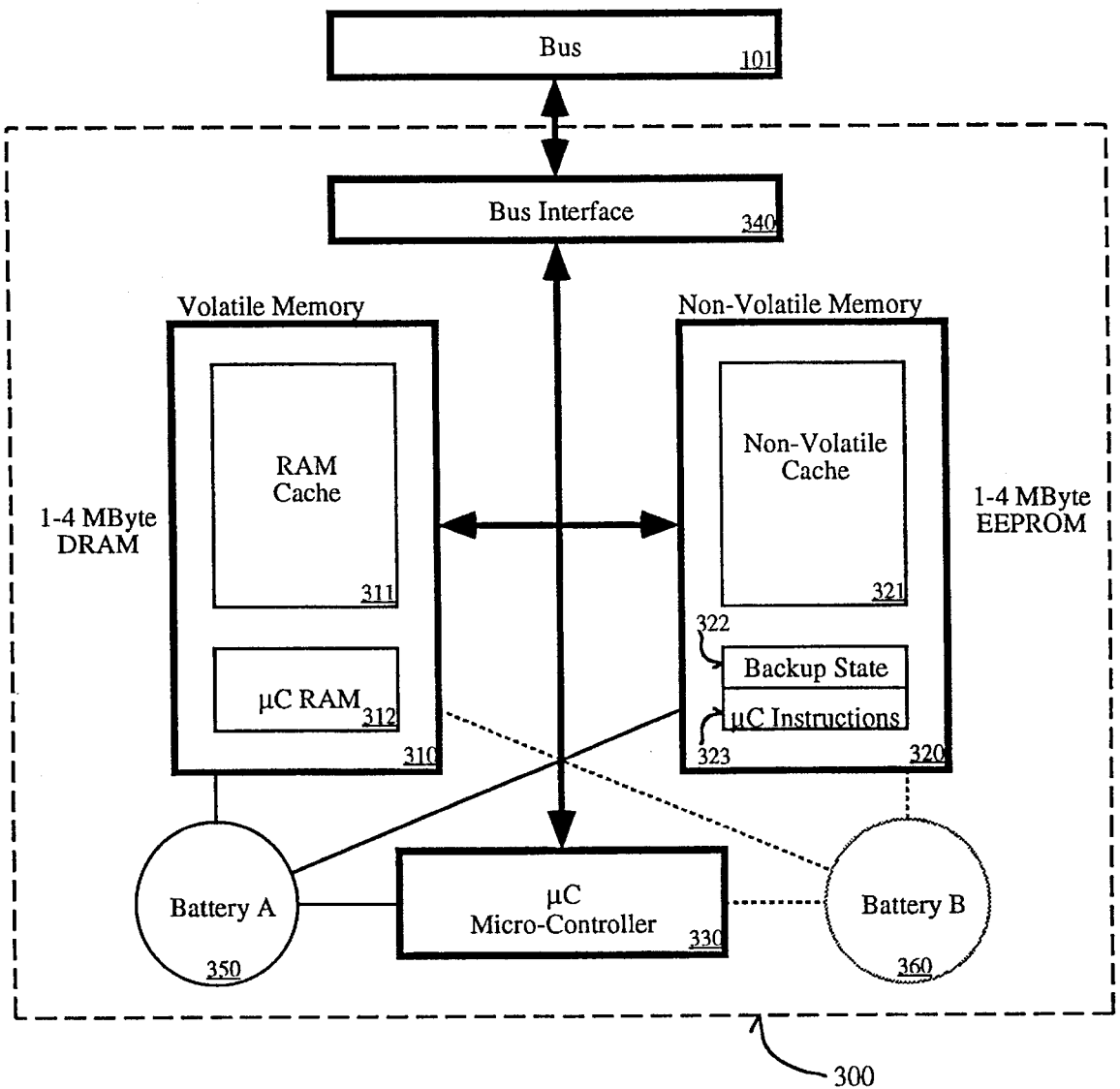
FIG. 3 shows the non-volatile disk cache of the preferred embodiment.

FIG. 3 shows a block diagram of the non-volatile disk cache 300 as used by the preferred embodiment. 300 comprises a volatile memory portion 310 and a non-volatile memory portion 320. In addition, non-volatile disk cache 300 comprises a microcontroller 330 for processing information between memories 310 and 320 and receiving information from a bus interface unit 340. Bus interface unit 340 is used for coupling with a computer system bus, such as bus 101 as shown in prior art system 100 in FIG. 1. In addition, 300 comprises a battery A 350 which is used for powering volatile memory 310, non-volatile memory 320, and microcontroller 330. Battery A 350 in the preferred embodiment is a 100 mAh lithium battery. A battery with similar capacity may be used in an alternative embodiment, such as a nickel-cadmium battery. In an alternative embodiment, 300 may comprise a second battery B 360 which augments the capacity of battery A in case of a failure of battery A 350. These batteries are used for powering cache memory 310, microcontroller 330, and EEPROM 320 when computer system power is lost.

Figure 1:
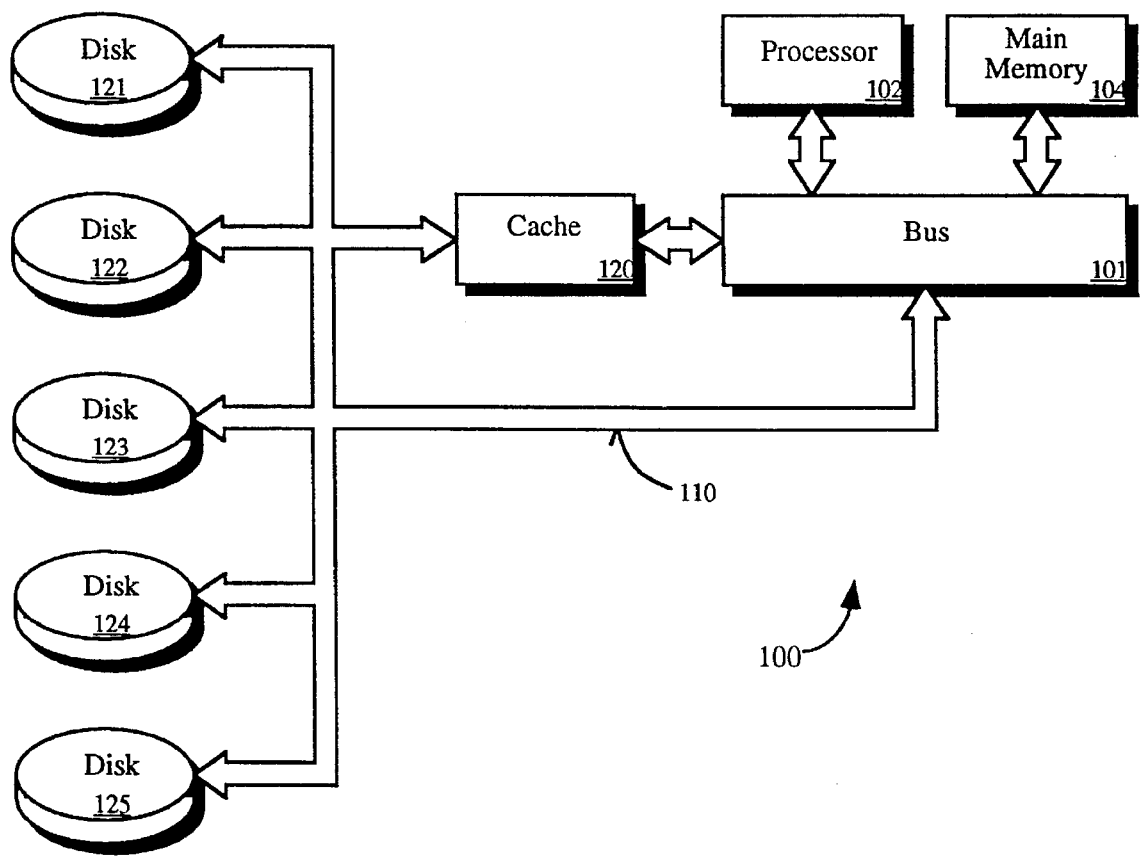
FIG. 1 shows a typical prior an computer system using a cache.

300 basically comprises two portions of memory: volatile memory 310 and non-volatile memory 320. Volatile memory 310, in the preferred embodiment, comprises approximately one or four megabytes of dynamic random access memory (DRAM). This provides sufficient space for a RAM cache on a system comprising 10 to 40 gigabytes of fixed media storage space (as those skilled in the art will appreciate, to optimize performance, a cache should contain approximately 0.1 to 0.01% of the total disk storage space on a system). The cache and cache tag area may generally be known as area 311. In addition, volatile memory 310 comprises a temporary storage area 312 for microcontroller 330 which is coupled to memory 310. During normal system operation, volatile memory 310 is used for storage and retrieval of information via bus 101 and bus interface 340. During computer system operation, 300 appears as a standard volatile memory RAM cache which may be operated in a write-back or write-through mode although the preferred embodiment operates in write-back mode to maximize performance. 300 also comprises a microcontroller 330 which, in a preferred embodiment, is an 80960KB or 8096 microcontroller available from Intel Corporation of Santa Clara, Calif. although any microcontroller of sufficient capability may be used. Microcontroller 330 provides all the necessary write-back operations required by the computer system via RAM cache 311, and/or fixed media devices such as disk drives 121 through 125 as shown in FIG. 1. Further, device 300 comprises a non-volatile memory portion 320 which is comprised of one to four megabytes (depending on total disk storage space) of electrically erasable programmable read only memory (EEPROM) such as a one megabyte CMOS EEPROM SIMM (single inline memory module, for example, a pan No. iSM001FLKA manufactured by Intel Corporation of Santa Clara, Calif.), or a one or four megabyte memory card (for example, an iMC001FLKA one megabyte memory card, or iMC004FLKA four megabyte memory card available from Intel Corporation). Non-volatile memory 320 in the preferred embodiment comprises three areas for the storage of various information. Nonvolatile cache 321 is used for storing information contained in RAM cache 311 when system power is lost. Backup state 322 is used for storing status information regarding whether the backup of non-volatile cache 321 was "successful." Further, memory device 320 comprises microcontroller instructions 323 for the performance of certain operations by microcontroller 330 such as copying data from 310 to non-volatile memory 320. Specific operations of microcontroller 330 will be discussed in more detail below.

Figure 2:
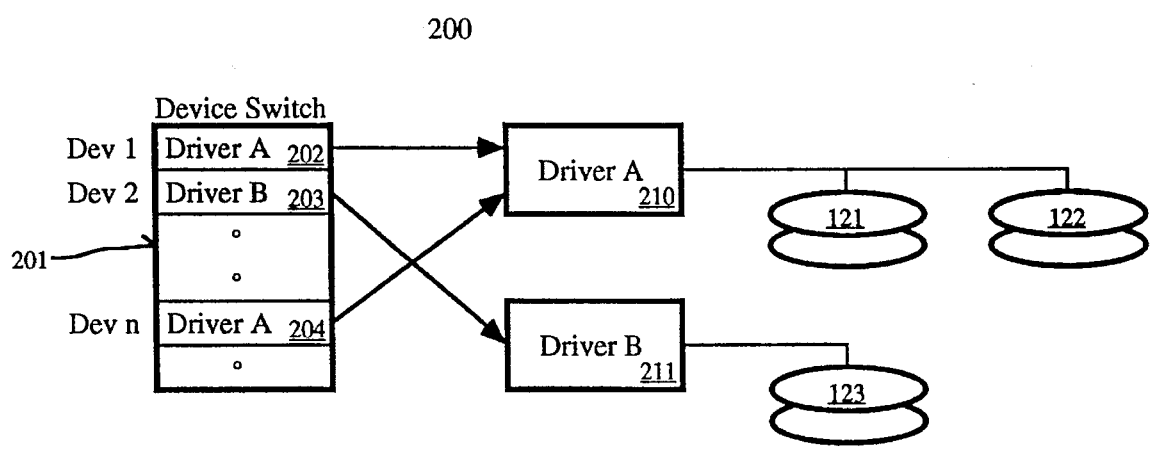
FIG. 2 shows the software architecture of a prior art fixed media software drivers which are used for reading from and writing to fixed media devices such as disk drives in a prior an computer system.
Figure 4:
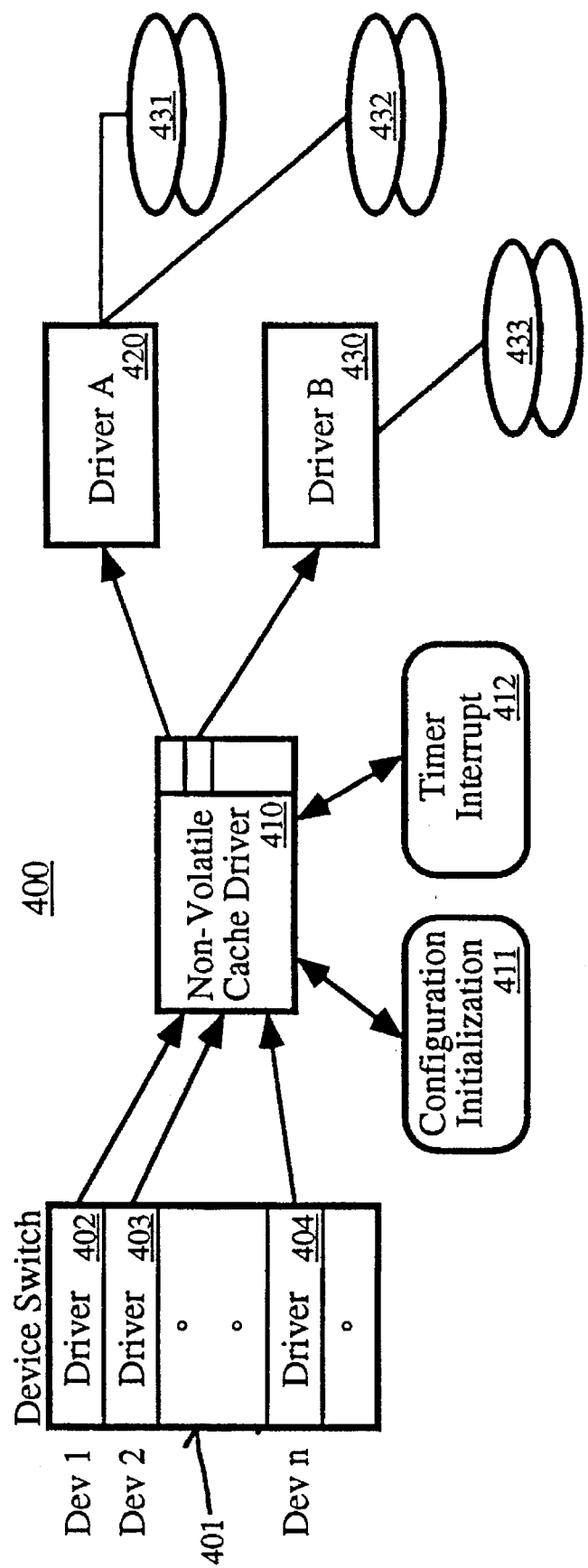
FIG. 4 shows a software organization used for operation of the non-volatile cache.

Organization for a system using device 300 shown in FIG. 3 is discussed with reference to FIG. 4. 400 in FIG. 4 shows a computer system similar to that discussed with reference to FIG. 2 except that 400 includes non-volatile cache driver 410 which resides between device switch unit 401 and drivers 420 and 430. Drivers 420 and 430 control physical media such as 431 through 433. For instance, several logical drivers such as 402, 403, and 404 may be accessible on device switch unit 401. Each of these logical devices will be accessible through driver 410 which in turn drives commands to physical device drivers 420 and 430 in system 400. Driver 410 will be operative upon certain configuration and initialization information 411 and timer interrupt information 412 according to a user's requirements. For instance, a user may specify an LRU algorithm wherein certain information residing in the cache is written back to devices such as 431 through 433 when the data contained in the RAM cache has not been accessed for a predetermined period of time as indicated by timer interrupt device 412. Non-volatile cache driver 410 operates as a write-back cache during system operation using RAM cache area 311 in FIG. 3 although it may also operate in write-through mode. During system power loss events or system bootstrapping, cache driver 410 will perform certain procedures to backup or restore information in RAM cache 311. All of the logical drivers such as 402 through 404 residing in the system will map to non-volatile driver 410, and non-volatile driver 410, during write-backs from cache 300, will control physical device drivers such as 420 and 430.

In a UNIX or MS-DOS brand operating system, driver 410 is designed to intercept disk operations which are generated by drivers such as 402, 403, and 404 residing in the operating system. This is done by replacing the entry points of the standard drivers in device switch table 401 with the entry point of non-volatile cache driver 410. The original entry points are saved internally by cache driver 410 and each physical driver is invoked to transfer data to/from disks at required times. Thus, all accesses made by standard disk drivers residing in the operating system will appear to application and system programs to be writing directly to disk media such as 431, 432, and 433. Read or write operations to physical media 431 through 433 are generally only performed when a read access is requested for data not in the cache or a write-back operation is performed.

Figure 5:
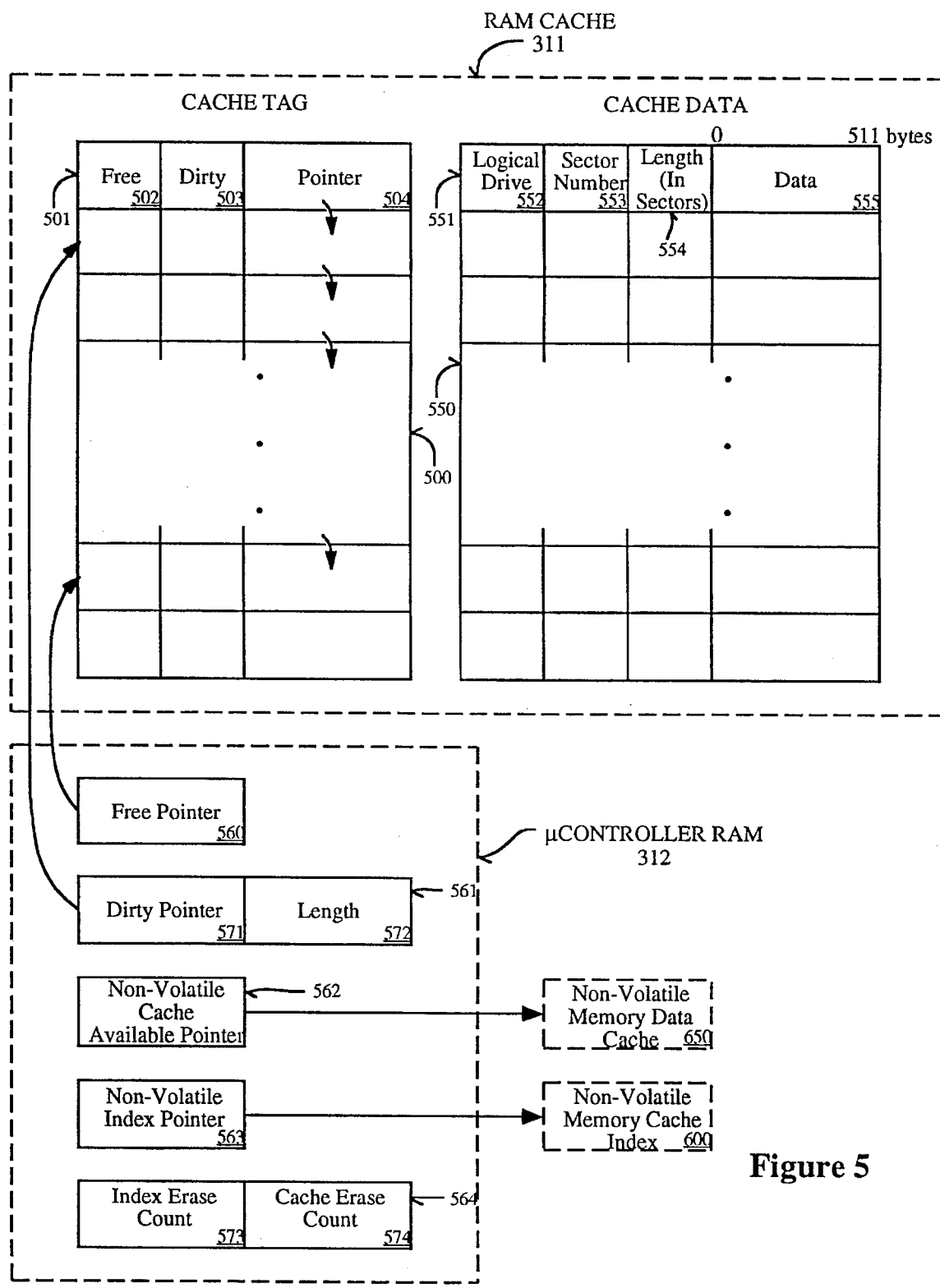
FIG. 5 shows various data structures used in the volatile memory portion of the non-volatile cache.

FIG. 5 shows various data structures contained in RAM cache 311 in FIG. 3. Cache 311 comprises two distinct sub-areas: cache tag 500; and cache data 550. Cache tag 500 is the portion of memory used for indicating the state of cache data. For every entry in cache tag 500 there is a corresponding area in cache data area 550. Therefore, as shown in FIG. 5, an entry such as 501 in cache tag 500 corresponds with an entry such as 551 in cache data 550. Cache tag 500 indicates whether the information contained in cache data area 550 is "dirty " (flagged for write-back to a device) and whether a location is allocated or not. Each entry such as 501 in cache tag 500 comprises three distinct fields: free field 502; dirty field 503; and pointer field 504. Free field 502 is a flag which indicates whether the block in cache data area 550 is available or not. A one indicates that the location is available, and a zero indicates that the block is allocated. Dirty field 503 is a flag which indicates whether the corresponding location in cache data area 550 should be written-back to disk. A one indicates that a write-back is required (the block is "dirty "), and a zero indicates that the block is "clean " (a write-back is not required).

Finally, each entry such as 501 contained in cache tag 500 contains a pointer field 504 which points to the next dirty entry block in cache tag 500. When dirty data is written back to devices coupled to the system (such as 121 through 125), pointer 504 is tracked in each entry until no more dirty data is located. The write-back operation is optimized by using an "elevator-seeking " method to minimize disk head movements. The elevator-seeking is performed in the preferred embodiment wherein microcontroller 330 scans through all dirty blocks in the cache to arrange the entries using a second data structure by track and sector number for each physical device. Then, using this second data structure, each of the blocks is written back to disk in an ordered fashion. In an alternative embodiment, data may be stored in the cache ordered by track and sector for each physical device in order to implement elevator-seeking write-backs. Write-back operations should be optimized to make them as efficient as possible and various techniques for optimizing write-back operations are well-known to those skilled in the art.

The second portion of data contained within RAM cache 311 is cache data area 550. Cache data area 550 contains entries such as 551 which correspond to entries such as 501 in cache tag 500. Each entry such as 551 in cache data 550 comprises four distinct fields: logical drive 552; sector number 553; length (in sectors) 554; and data 555. When a write-back is performed by microcontroller 330, each of the fields is used to indicate the location, in a logical device, of the data in block 555. 552 indicates the logical drive into which the data block should be written, the sector number on the device is indicated by field 553, and the length of the data contained within 555 is indicated by field 554. Only cache data stored in 550 that is indicated as "dirty " by field 503 in cache tag 500 is written back to the fixed media at write-back time.

As shown in FIG. 5, in addition to cache tag 500 and cache data area 550, several variables are maintained in microcontroller RAM 312 for the preferred embodiment. 560 is a "free " pointer and indicates the last available or unallocated block in cache tag 500, and thus the last unallocated location in cache data area 550. When data is read from bus 101 which has not previously been cached, microcontroller 330 uses free pointer 560 to indicate the first location to which new data may be cached. Free pointer 560 is updated by microcontroller 330 every time information is put into the cache. When free pointer 560 reaches the end of cache tag 500, free pointer 560 is reset to point to the first location of cache tag 500. As cache data contained within 550 is written back to fixed media devices coupled to the computer system, dirty field 503 is reset to its initial state to indicate that the area has been written back to disk. Free pointer 560 provides an efficient means to access the first area of unallocated memory in cache data area 550.

Microcontroller 330 also maintains datum 561 which contains two fields: dirty pointer 571; and length 572. 561 is used for determining the start and the size of dirty data contained in cache 550. Dirty pointer 571 contains the address of the first dirty location h: cache tag 500. As locations in cache 500 are written back to fixed media devices, dirty pointer 571 is updated to point to the next dirty block in cache data area 550. Further, length 572 keeps track of the length, in entries, of the current dirty data. Length 572 is updated every time a write-back of dirty data is performed. Generally, dirty dam resides between the memory location indicated by dirty pointer 571, and the location pointed to by free pointer 560. Length 572 is thus equal to the number of cache tag and thus cache data entries between those two pointers. Upon a power loss in the computer system, dirty pointer 571 and length 572 are used to write data contained within cache data area 550 into non-volatile cache 321. To keep track of non-volatile memory area 320, other pointers must be maintained by microcontroller 330.

Other data maintained in microcontroller RAM 312 by microcontroller 330 in the preferred embodiment are related to the status of non-volatile memory 320. Non-volatile memory available pointer 562 shown in FIG. 5 points to the first unwritten area in the non-volatile cache 650. This is the next memory location after the last area written to during the last system power loss. Because the EEPROM of the preferred embodiment can only be erased a finite number of times and guarantee data integrity (approximately 10,000 times in the preferred embodiment) it is necessary to maximize the use of non-volatile memory 320 by writing data in a sequential and cyclical fashion. A first area will be written to during a first power loss, and the next sequential area will be written to during a subsequent power loss. When the end of each section or block of memory is reached, the pointer is reset to the beginning of the block. The use of the non-volatile memory 320 is maximized as blocks are written into as little as possible. Non-volatile index pointer 563 points to the last available index location in index area 600 of non-volatile memory 321 (discussed in more detail below).

Lastly, two variables are retained in the preferred embodiment to track the number of erasures of both index area 600 and the non-volatile disk cache 650 in non-volatile memory 320. These are contained in 564. 564 contains index erase count 573 which retains the number of times the non-volatile index area 600 has been erased, and 574 which retains the number of times non-volatile cache 650 has been erased. When either of the non-volatile erase counts has exceeded 10,000, the system alerts the user that non-volatile memory is not guaranteed to be consistent, and thus appropriate action (such as replacing the non-volatile cache) should be taken by the user. Also, microcontroller 330 reverts to a write-through cache replacement algorithm in order to maintain data in cache 311 consisted with the data on fixed media devices. Non-volatile memory 320 is no longer used for backing up volatile cache 311 during a power loss event. The structure of the non-volatile cache's index area and data area will now be discussed with reference to FIG. 6.

Non-volatile memory 320 comprises two distinct portions: cache index 600; and cache data area 650. Cache data area 650 contains the same structure as volatile cache data 550, however, the number of entries in 650 is a subset of those in 550. In each entry such as 651 shown in FIG. 6, there are fields corresponding with those in volatile cache data area 550. For instance, each entry within non-volatile data area 650 are logical drive 652, sector number 653, length field 654, and data field 655. When system power is lost, a section of the volatile cache data area 550 is copied to non-volatile cache data area 650 depending on whether the "dirty" bit 503 in each entry is set. This process is discussed in more detail below.

Non-volatile cache index area 600 is used for retaining information about non-volatile cache data area 650 for the duration in which computer system power is lost. Cache index area 600 retains a count of the number of times areas 600 and 650 in non-volatile memory have been erased. Thus the user can be alerted if the number of erasures exceeds a maximum tolerance amount. Each entry in non-volatile index area 600 such as 601 contains five distinct fields: valid field 602; dirty pointer 603; length field 604; data erase count 605; and index erase count 606. Non-volatile index area 600 is written to in a sequential fashion to reduce the number of times it must be erased. Valid field 602 is used for indicating which memory locations in non-volatile index area 600 contain valid dam. When an area in a non-volatile RAM is erased, it contains all ones or all bits set. Valid field 602 is cleared when writing in each entry of the preferred embodiment to indicate valid data is present. When computer system power is restored, microcontroller 330 scans through all valid bits in the index area to find the last entry which had a valid field 602 containing zero. This will be the memory location which contains the current state of cache data area 650. This information is retrieved and used for updating information in fixed media devices coupled to the computer system. In the example shown in FIG. 6, entry 607 is the last valid entry in index 600 as indicated by field 602 which contains a zero. Information in entry 607 will thus be used to restart the computer system using the example shown in FIG. 6.

Figure 6:
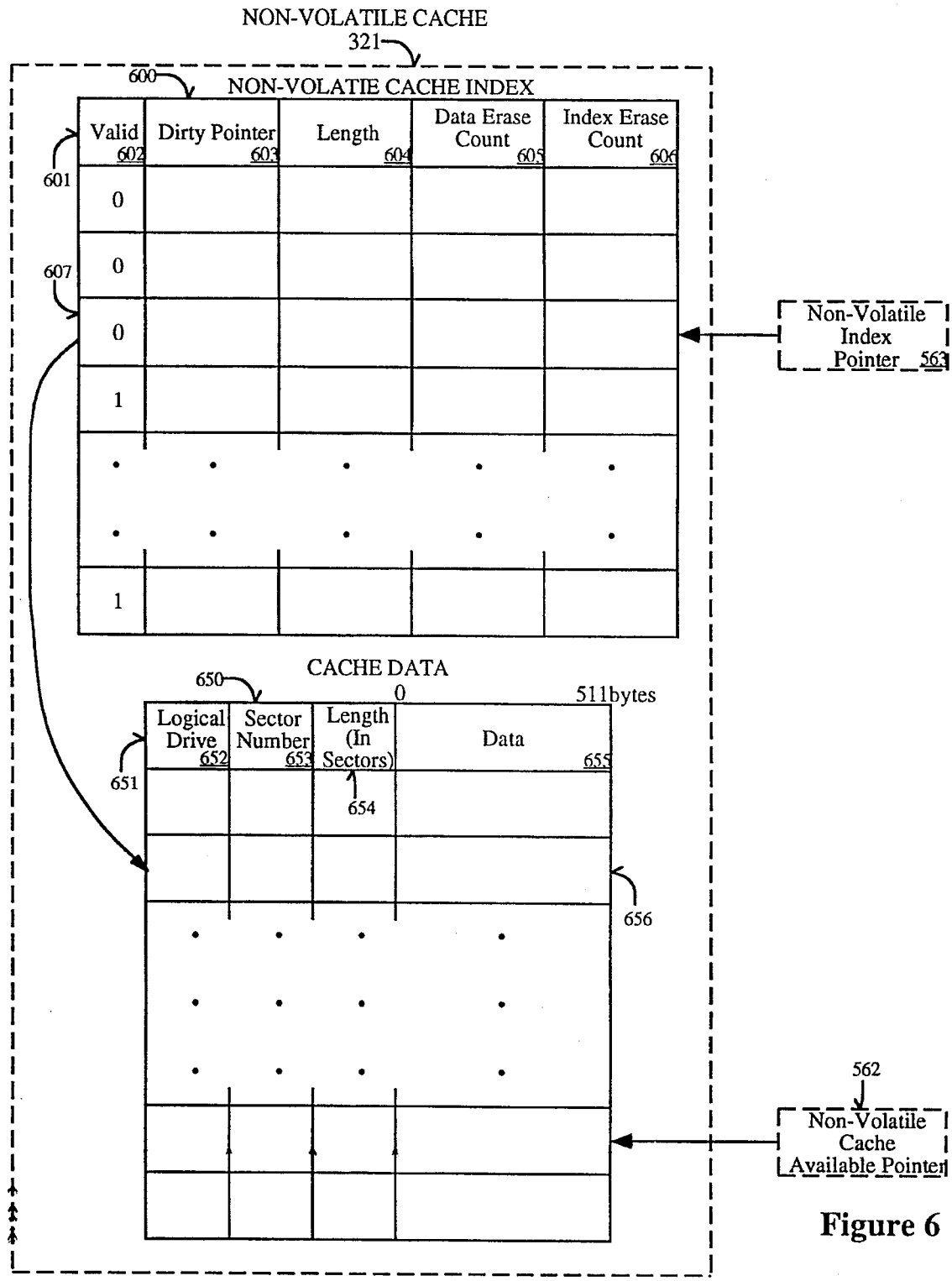
FIG. 6 shows data structures contained in the non-volatile portion of the non-volatile cache.

The next fields in each entry of cache index area 600 are dirty pointer 603 and length 604. 603 and 604 perform the same function as 571 and 572 shown in FIG. 5 except that dirty pointer 603 and length 604 indicate the start and length of dirty data in non-volatile cache 650. When system power is restored, microcontroller 330 looks at dirty pointer 603 to determine the beginning of the dirty data contained within non-volatile cache 650. Microcontroller 330 writes back all information contained in non-volatile cache 650 starting at the location pointed to by dirty pointer 603 for the length stored in 604. As is shown in FIG. 6, the last valid entry 607 in non-volatile cache index 600 points to entry 656 in non-volatile cache data area 650.

Figure 9:
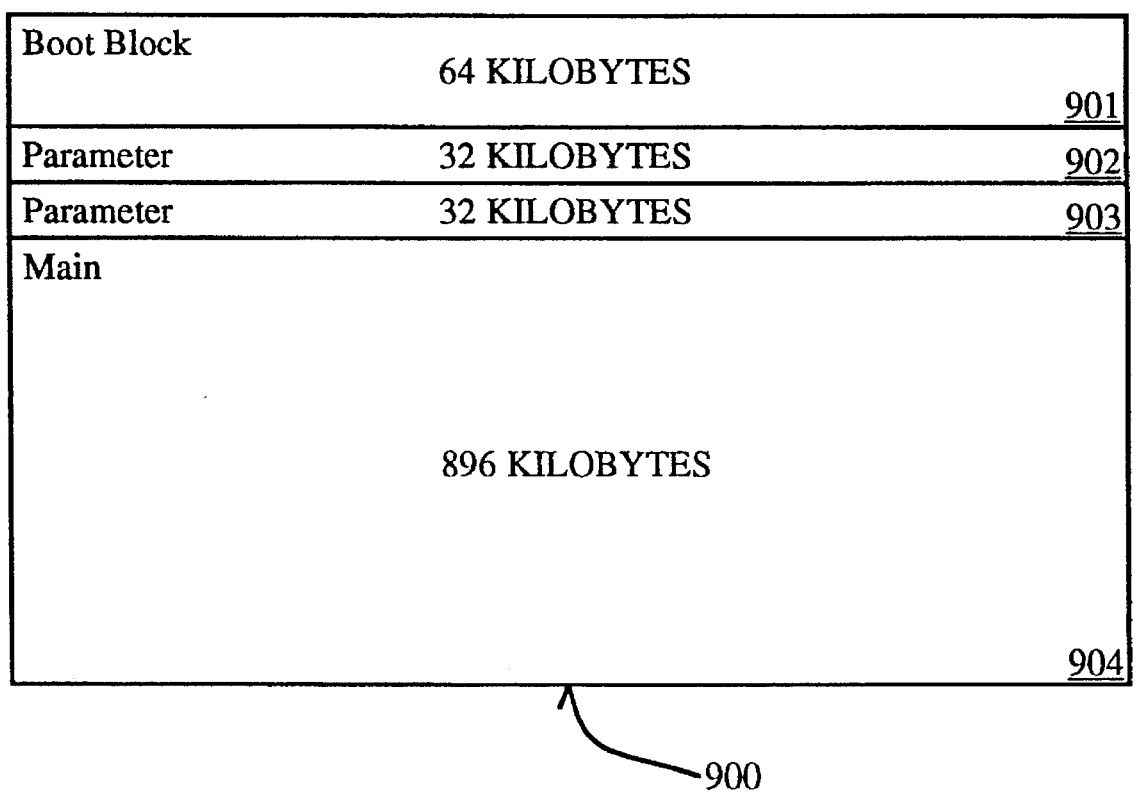
FIG. 9 shows portions of a non-volatile memory device which may be allocated for various functions in the preferred embodiment.

600 also contains fields 605 and 606 to store the number of times non-volatile memory area 320 has been erased. Two fields are required to retain this information because non-volatile memories, such as those used in the preferred embodiment, usually provide multiple blocks which may each be independently erased. An erase count field such as 605 for cache data area 650 is thus stored separately from an erase count field 606 for index area 600. For instance, with reference to FIG. 9, a one megabyte non-volatile memory such as 900 may be used for storage of cache data such as 650 and a cache index such as 600. As is shown in FIG. 9, 900 comprises four distinct blocks: 901; 902; 903; and 904. Non-volatile memory 900 is a part No. 28F001B, EEPROM available from Intel Corporation of Santa Clara, Calif. although other EEPROM's with independently erasable blocks may be used. As is shown in FIG. 9, 900 comprises a boot block area 901 which is 64 kilobytes in length, a parameter area 902 which is 32 kilobytes in length, a second parameter area 903 which is 32 kilobytes in length, and a main area 904 which is 896 kilobytes in length. Each area is independently erasable, and may be used for the separate storage of the cache index 600 and the cache data area 650. In one embodiment, boot block area 901 may be used for storage of cache index 600, and main area 904 may be used for storage of cache data area 650. When the end of each memory block is reached, the block is erased, and the erasure count for the block will be incremented by one.

The storage of data from volatile cache 311 to non-volatile cache 321 by microcontroller 330 will take place when a power loss has been detected for a specified period of time. Because most power failures are transitory in nature, it is appropriate to delay the backup to the non-volatile memory 321 for a few seconds. If power returns within this period, data will be written back to fixed media devices from RAM cache 311 shown in FIG. 3. However, if the power loss is not transitory, microcontroller 330 will backup the data contained in RAM cache 311 to non-volatile memory area 321. (The period of power loss indicating that it is not transitory will depend on battery capacity and the amount of cache memory needed to be stored). The memory of the preferred embodiment requires approximately 10 seconds per megabyte, and therefore a backup of four megabytes will, in a worst case scenario, take approximately 40 seconds. If a power is lost for this defined period, process 700 shown in FIG. 7 is performed.

Figure 7:
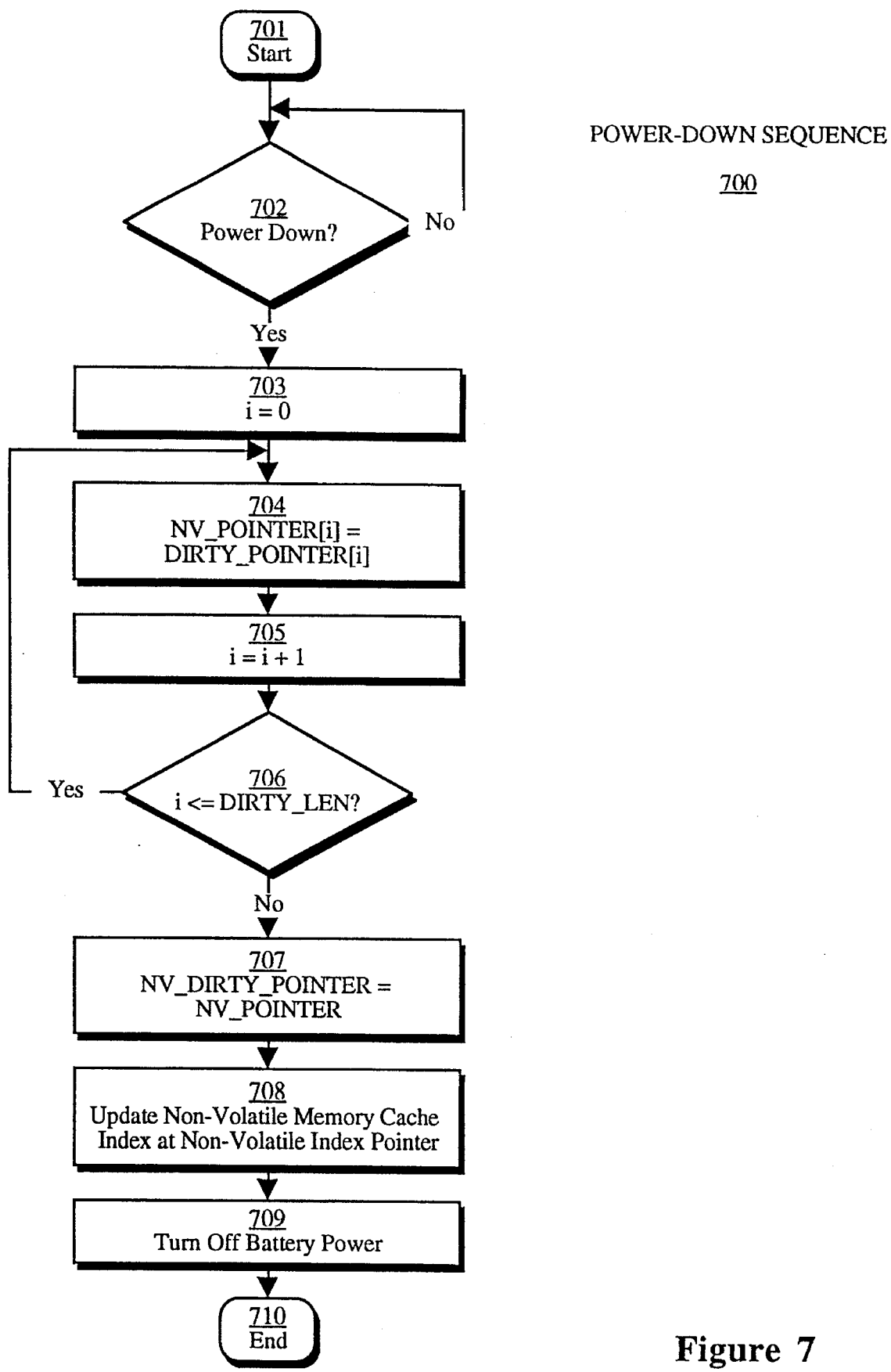
FIG. 7 shows a power down sequence executed by a computer system which has a non-volatile cache.

Process 700 in FIG. 7 starts at step 701, and determines at step 702 whether the power outage is transitory. If it is a transitory outage, then microcontroller 330 loops continuing to determine whether a power loss has occurred at step 702. If the power loss is not transitory, then the power-down process begins at step 703 by initializing index variable i to zero. The volatile cache is then copied to non-volatile memory in the next three steps. Step 704 is used for setting a location in non-volatile memory 650 pointed to by NV_POINTER (non-volatile available pointer 653) offset by i equal to the data contained in the location in volatile RAM cache pointed to by DIRTY_POINTER (pointer 571) which is also offset by i. i is incremented at step 705, and steps 704 and 705 are performed as long as i is less than or equal to the length of dirty data DIRTY_LEN (length 572) contained within volatile memory, as determined at step 706. Once i exceeds the number of dirty memory locations stored in 572, step 706 proceeds to step 707 which sets NV_DIRTY_POINTER (non-volatile dirty pointer 603) equal to the NV_POINTER (the non-volatile available pointer 652). In other words, the data which must be copied to devices when system power is restored starts at the location which was previously available. Non-volatile memory cache index 600 is updated at step 708 by setting field 602 in the next entry equal to zero indicating that the entry is valid. NV_DIRTY_POINTER (dirty pointer 603) contained in the entry is set equal to the non-volatile cache available pointer (NV_POINTER), length field 604 is set equal to DIRTY_LEN, and the cache erase and index erase counts are placed into fields 605 and 606. All steps for shut-down are complete and, at step 709, and battery power supplied by 350 is turned off. Power down sequence 700 is thus complete at step 710. The system may remain without power for an indefinite period without the loss of data retained in memory 320. Any data contained in volatile cache memory 310 will be lost, however, all "dirty" data which may cause data loss or file corruption has already been stored in non-volatile memory 320 using process 700. The system may be restarted at any time, performing writebacks of blocks from 650 into fixed media devices when power returns to the system.

Figure 8A:
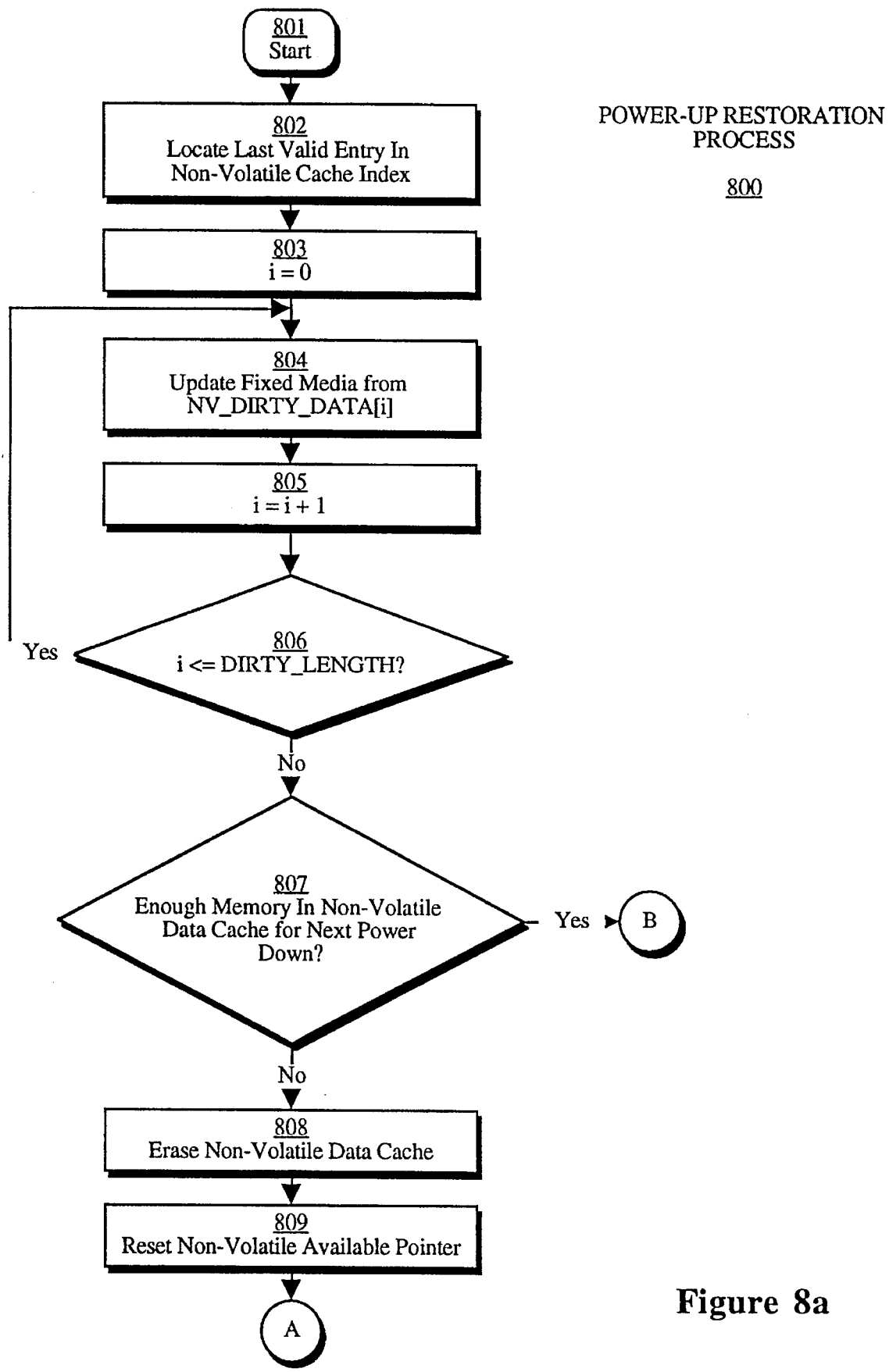
FIG. 8a and 8b shows a process executed during system bootstrap to restore data contained in a non-volatile cache.
Figure 8B:
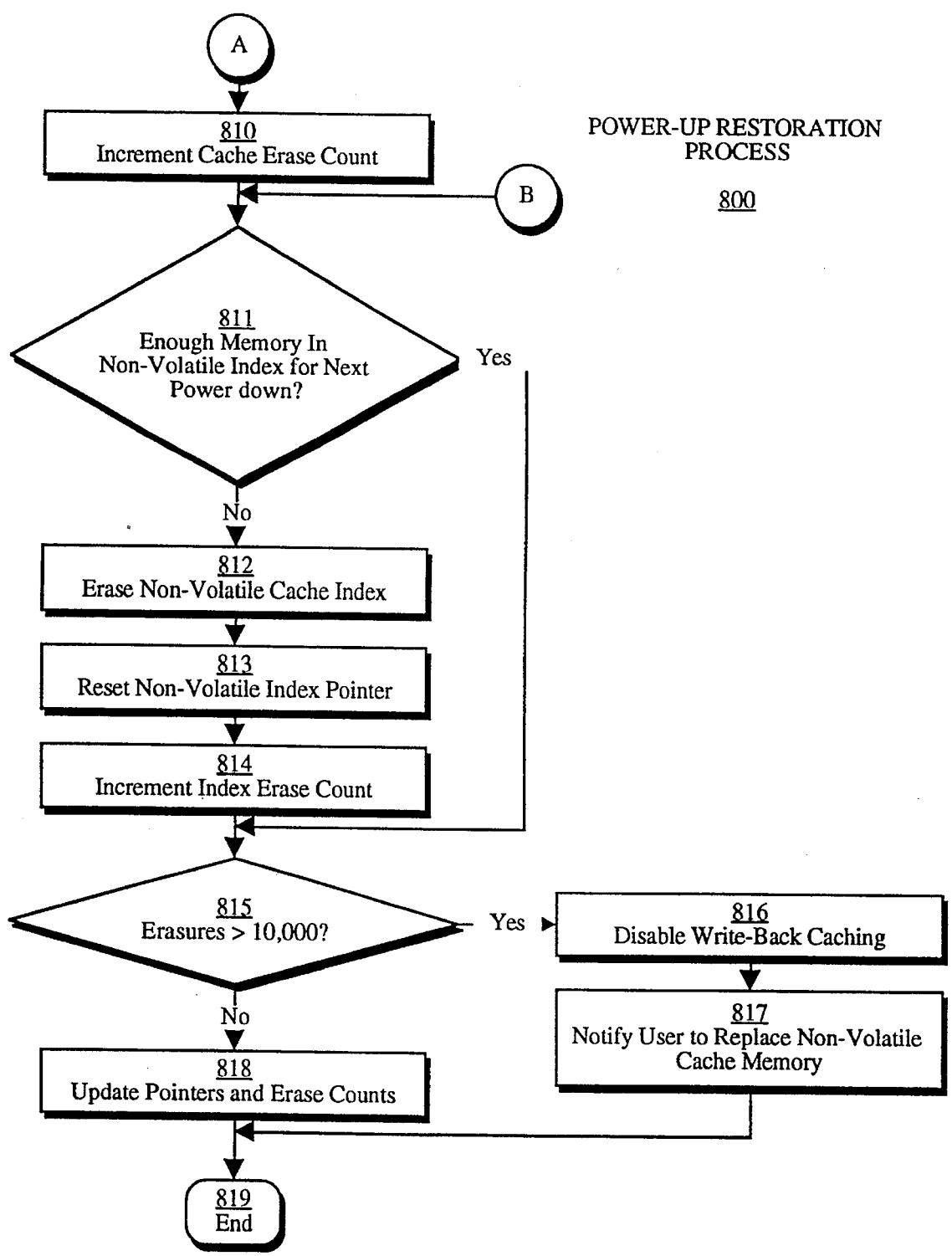

The power-up sequence for non-volatile cache 300 is discussed with reference to process 800 shown in FIGS. 8a and 8b. As shown in FIG. 8a, upon computer system power being restored, microcontroller 330 will start executing process 800 at step 801. The last valid entry is located in non-volatile cache index area 600 at step 802 by scanning each valid field 602 in each cache index entry in 600. Once the last valid entry is containing a zero in field 602, process 800 proceeds to step 803 wherein index variable i is set to zero. Then, steps 804 through 806 are repetitively performed wherein the fixed media attached to the computer system is updated at step 804 using the NV_DIRTY_DATA contained in field 603 of the last valid entry in non-volatile index 600, offset by i. Index variable i is incremented at step 805. It is determined at step 806 whether the index variable is still less than or equal to the length of dirty data (DIRTY_ LEN from field 604 of the entry in cache index 600) contained within non-volatile storage. If so, step 806 proceeds back to 804 and steps 804 through 806 are repetitively performed. If, however, i has exceeded DIRTY$_{13}$ LEN, then process 800 proceeds to step 807. 807 determines whether sufficient memory is available in non-volatile data cache 650 for the next power loss. Enough non-volatile memory is present when all possible data from volatile cache 311 may be storm in non-volatile cache area 650 in a worst case scenario. If there is not sufficient memory, then step 807 proceeds to step 808 wherein the block in non-volatile memory 320 containing data cache 650 is erased. This leaves non-volatile index 600 intact. Once erased, the non-volatile available pointer is set equal to the beginning of the block containing the non-volatile cache data 650 at step 8(19, and the non-volatile cache erase count is incremented by one at step 810 as shown in FIG. 8b. As was discussed with reference to FIG. 6, this information is later stored in field 605 of the entry in index 600.

Step 811 in FIG. 8b is performed after step 810, or after step 807 if there was sufficient memory in non-volatile cache area 650. 811 determines whether there is sufficient memory in non-volatile index 600 for the next power down. Non-volatile index 600 requires only one more entry. If the previous index entry was the last remaining entry in the memory block, then the entire block containing the index must be erased. At step 812 the non-volatile cache index block is erased if there are no more entries left in the block containing non-volatile cache index 600. Each erase operation is performed by the system in the background of system operation at step 812. System operation can therefore continue normally while memory is being erased. After starting the erase operation of the non-volatile index in the background, non-volatile index available pointer is reset at step 813 to the beginning of the index block.

At step 814, the index erase count is incremented. Process 800 proceeds to perform step 815 wherein both the non-volatile index erase count and the non-volatile cache erase count are checked to determine whether either of these values have exceeded 10,000. In the preferred embodiment, using current state of the art EEPROM technology, in order to guarantee the integrity of data stored in non-volatile memory 320 the maximum number of erasures of a memory is approximately 10,000. If the maximum number of erasures has been exceeded, then non-volatile RAM 320 is not guaranteed to be a reliable medium for storage. Also, a status bit in microcontroller instruction area 312 is set at step 816 indicating that write-through caching only is to be used. Write-through caching is used because the loss of system power with data contained in volatile cache 311 would result in data loss and possible file corruption on fixed media devices. Therefore, each item which is cached to volatile memory 310 is also written to fixed media devices using a write-through method. The user is notified at step 817 to replace the non-volatile cache memory. Process 800 ends at 819 after user notification. If the number of erasures for either the non-volatile index 600 or the non-volatile cache 650 has not exceeded 10,000, as determined at step 815, then at step 818, non-volatile index pointer 563 and non-volatile available pointer 562 are updated. Non-volatile index pointer is set to the next location in cache index 600 and the non-volatile cache available pointer 562 is set to the dirty pointer contained in field 603 of the last entry, offset by the dirty length contained in 604. If any erase operations have taken place, then the erase counts are also updated. Process 800 ends at step 819, and normal system operation resumes, with the contents of the fixed media devices updated, and non-volatile cache device 300 prepared for the next power loss in the system.

Although the recent invention has been described particularly with reference to FIGS. 1 through 9, it will be apparent to one skilled in the art that the present invention has utility far exceeding that disclosed in the figures. It is contemplated that many changes and modifications may be made, by one of ordinary skill in the art, without departing from the spirit and scope of the present invention as discussed above.

What is claimed is:

1. An apparatus in a computer system for storing data from a volatile cache during a power loss in the computer system comprising:
   a. a volatile cache memory;
   b. an electrically erasable programmable read-only memory (EEPROM) for receiving the contents of said volatile cache memory during said power loss;
   c. a means for detecting the power loss in the computer system;
   d. a means for copying the data contained in the volatile cache memory to the EEPROM upon detection of the power loss, wherein the means for copying copies only the data which has not been written-back to a device coupled to the volatile cache memory, the copying means coupled to the volatile cache memory, the EEPROM, and the detecting means; and
   e. a means for powering coupled to the volatile cache memory and the copying means, the means for powering being independent of the computer system power wherein said means for powering has sufficient capacity to power said volatile cache memory and said copying means for the duration of an operation to copy the contents of said volatile cache memory to said EEPROM upon said detection of said power loss.

2. The apparatus of claim 1 wherein the detecting means for the power loss in the computer system comprises a microcontroller.

3. The apparatus of claim 1 wherein the copying means comprises a microcontroller.

4. The apparatus of claim 1 wherein the powering means comprises a battery.

5. The apparatus of claim 1 wherein the powering means comprises a circuit which ceases providing power to the volatile cache memory and the copying means upon completion of the operation to copy the contents of the volatile cache memory to the EEPROM.

6. A method of restoring the data contained in an electrically erasable programmable read-only memory (EEPROM) to a computer system device coupled to a computer system comprising:
   a. determining a last location in the EEPROM at which valid device data resided;
   b. writing to the device all data starting at the last location which was modified but not written to the device contained in the EEPROM;
   c. determining whether there is sufficient memory in the EEPROM to store additional data from a volatile cache memory coupled to the EEPROM, and if there is not, erasing the EEPROM; and
   d. determining whether the number of erasures of the EEPROM has exceeded a first value, and if it has, inhibiting the computer system from writing to the EEPROM.

7. An apparatus for use in a computer system comprising:
   a. a volatile cache memory;
   b. a non-volatile memory for receiving data contained in said volatile cache memory during a power interruption;
   c. a detection circuit for detecting said power interruption in said computer system;
   d. a copying circuit coupled to said volatile cache, said non-volatile memory, and said detection circuit, said copying circuit for copying a first set of data contained in said volatile cache memory to said non-volatile memory upon detection of said power interruption, wherein said first set of data includes only data that has not been written-back to a device coupled to said volatile cache memory; and
   e. a power circuit coupled to said volatile cache memory, said non-volatile memory and said copying circuit, said power circuit being independent of said computer system power and having sufficient capacity to power said volatile cache memory and said copying circuit for the duration of an operation to copy said first set of data contained in said volatile cache memory to said non-volatile memory upon said detection of said power interruption.

8. The apparatus of claim 7 further comprising a restoration circuit coupled to said volatile cache memory and said non-volatile memory for restoring said data to said volatile cache memory from said non-volatile memory upon a restoration of power in said computer system.

9. The apparatus of claim 7 wherein said non-volatile memory is an electrically erasable programmable read-only memory (EEPROM).

10. The apparatus of claim 9 further comprising a cycle count circuit for retaining the number of cycles said contents of said volatile cache memory has been copied to said EEPROM.

11. A computer system comprising:
   a. a volatile cache memory;
   b. a non-volatile memory for receiving contents of said volatile cache memory during a power interruption;
   c. a detection circuit for detecting said power interruption in said computer system;
   d. a copying circuit coupled to said volatile cache, said non-volatile memory, and said detection circuit, said copying circuit for copying said contents contained in said volatile cache memory to said non-volatile memory upon detection of said power interruption, wherein said copying circuit copies only contents of said volatile cache memory which have not been written-back to a device coupled to said volatile cache memory; and
   e. a power circuit coupled to said volatile cache memory, said non-volatile memory and said copying circuit, said power circuit being independent of said computer system power and having sufficient capacity to power said volatile cache memory and said copying circuit for the duration of an operation to copy said contents of said volatile cache memory to said non-volatile memory upon said detection of said power interruption.

12. The computer system of claim 11 further comprising a restoration circuit coupled to said volatile cache memory and said non-volatile memory restoring said contents of said volatile cache memory from said non-volatile memory upon a restoration of power in said computer system.

13. The computer system of claim 11 wherein said non-volatile memory is an electrically erasable programmable read-only memory (EEPROM).

14. The computer system of claim 13 further comprising a cycle count circuit for retaining the number of cycles said contents of said volatile cache memory has been copied to said EEPROM.

15. A method in a computer system of storing the data contained in a volatile cache for a device coupled to the computer system to an electrically erasable programmable read-only memory (EEPROM) upon losing computer system power comprising the following steps:
   a. detecting a power loss in the computer system;
   b. determining a first location in the EEPROM, the first location being the last location in the EEPROM at which data was written; and
   c. writing a first set of data from the volatile cache into the EEPROM starting at the last location, the first set of data comprising only data which has been modified but has not been written to the device.

16. The method of claim 15 wherein the step of detecting comprises determining whether the computer system power has been lost for a first duration of time.

17. The method of claim 16 wherein the first duration of time is sufficient to allow all data contained in the volatile cache to be copied to the non-volatile memory.

18. The method of claim 15 further comprising the following steps if the computer system power is restored:
   a. determining a last location in the EEPROM at which valid data resided;
   b. writing the first set of data to the device;
   c. determining whether there is sufficient memory in the EEPROM to store a second set of data, and if there is not, erasing the EEPROM; and
   d. determining whether the number of erasures of the EEPROM has exceeded a first value, and if it has, inhibiting the computer system from writing to the EEPROM.

* * * * *

UNITED STATES PATENT AND TRADEMARK OFFICE
CERTIFICATE OF CORRECTION

PATENT NO. : 5,519,831
DATED : May 21, 1996
INVENTOR(S) : Gerald S. Holzhammer

It is certified that error appears in the above-indentified patent and that said Letters Patent is hereby corrected as shown below:

In column 13 at line 12 delete "all" and insert --only--

Signed and Sealed this

Fifteenth Day of July, 1997

Attest:

BRUCE LEHMAN

*Attesting Officer*  *Commissioner of Patents and Trademarks*